US012630037B1

(12) United States Patent
    Kobayashi

(10) Patent No.:     US 12,630,037 B1
(45) Date of Patent:          May 19, 2026

(54) CHARGER FOR ELECTRIC VEHICLE

(71) Applicant: SUBARU CORPORATION, Tokyo (JP)

(72) Inventor: Nobuaki Kobayashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 147 days.

(21) Appl. No.: 18/848,681

(22) PCT Filed: May 12, 2023

(86) PCT No.: PCT/JP2023/017949
    § 371 (c)(1),
    (2) Date: Sep. 19, 2024

(87) PCT Pub. No.: WO2024/236648
    PCT Pub. Date: Nov. 21, 2024

(51) Int. Cl.
    *B60L 53/62*          (2019.01)
    *B60L 53/22*          (2019.01)
    *H02M 3/07*           (2006.01)
    *H02M 7/487*          (2007.01)

(52) U.S. Cl.
    CPC ............... *B60L 53/62* (2019.02); *B60L 53/22* (2019.02); *H02M 3/07* (2013.01); *H02M 7/487* (2013.01)

(58) Field of Classification Search
    CPC .......... B60L 53/22; B60L 53/62; H02M 3/07; H02M 7/00
    See application file for complete search history.

(56)                    References Cited

U.S. PATENT DOCUMENTS 8,498,137 B2 *   7/2013   Joseph ................... H02M 7/487
                                                           363/131
    12,418,246 B2 *  9/2025   Kuder .................... H02M 1/007

FOREIGN PATENT DOCUMENTS

JP        2022108885 A   *   7/2022   ........... H02M 7/487
    JP        2024008396 A   *   1/2024   ......... H02M 7/5387

OTHER PUBLICATIONS

International Search Report dated Nov. 11, 2023, from International Application No. PCT/JP2023/017949, 8 pages.

* cited by examiner

*Primary Examiner* — Rexford N Barnie
*Assistant Examiner* — Joseph N Inge
(74) *Attorney, Agent, or Firm* — Rimon P.C.

(57)                      ABSTRACT

A charger for an electric vehicle includes an NPC multilevel inverter circuit that outputs a driving current to a travel motor. In at least one leg, an upper clamp is an upper switching clamp configured to perform switching operation, and a lower clamp is a lower switching clamp configured to perform switching operation. One of a pair of power lines through which electric power for charging is transmitted is coupled to a connection point of the upper switching clamp and an upper arm. The other one of the power lines is coupled to a connection point of the lower switching clamp and a lower arm. Moreover, a controller is configured to drive the multilevel inverter circuit to step up the electric power for charging by charge pump operation using two capacitors.

5 Claims, 4 Drawing Sheets

[ FIG. 1 ]
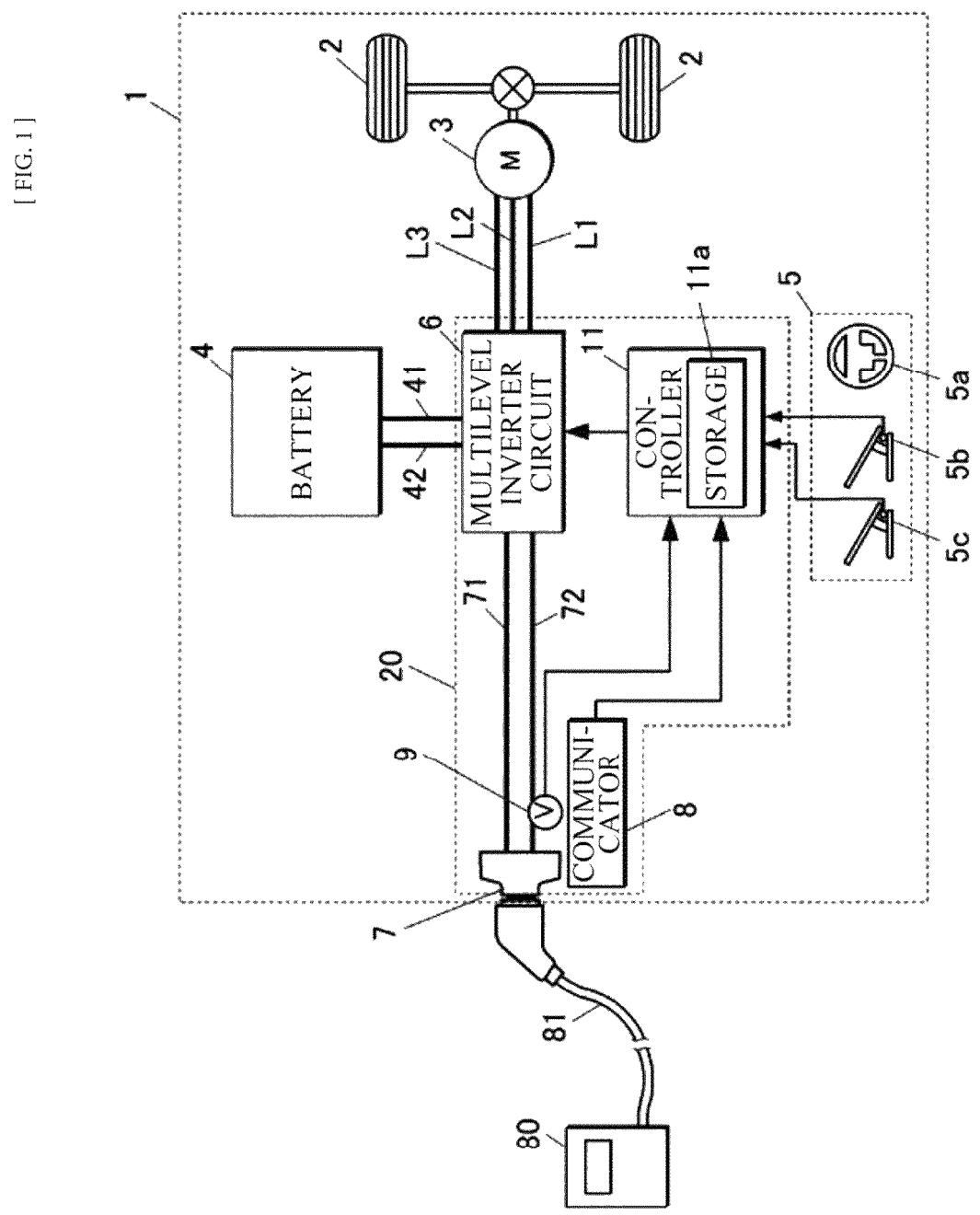

[ FIG. 2 ]
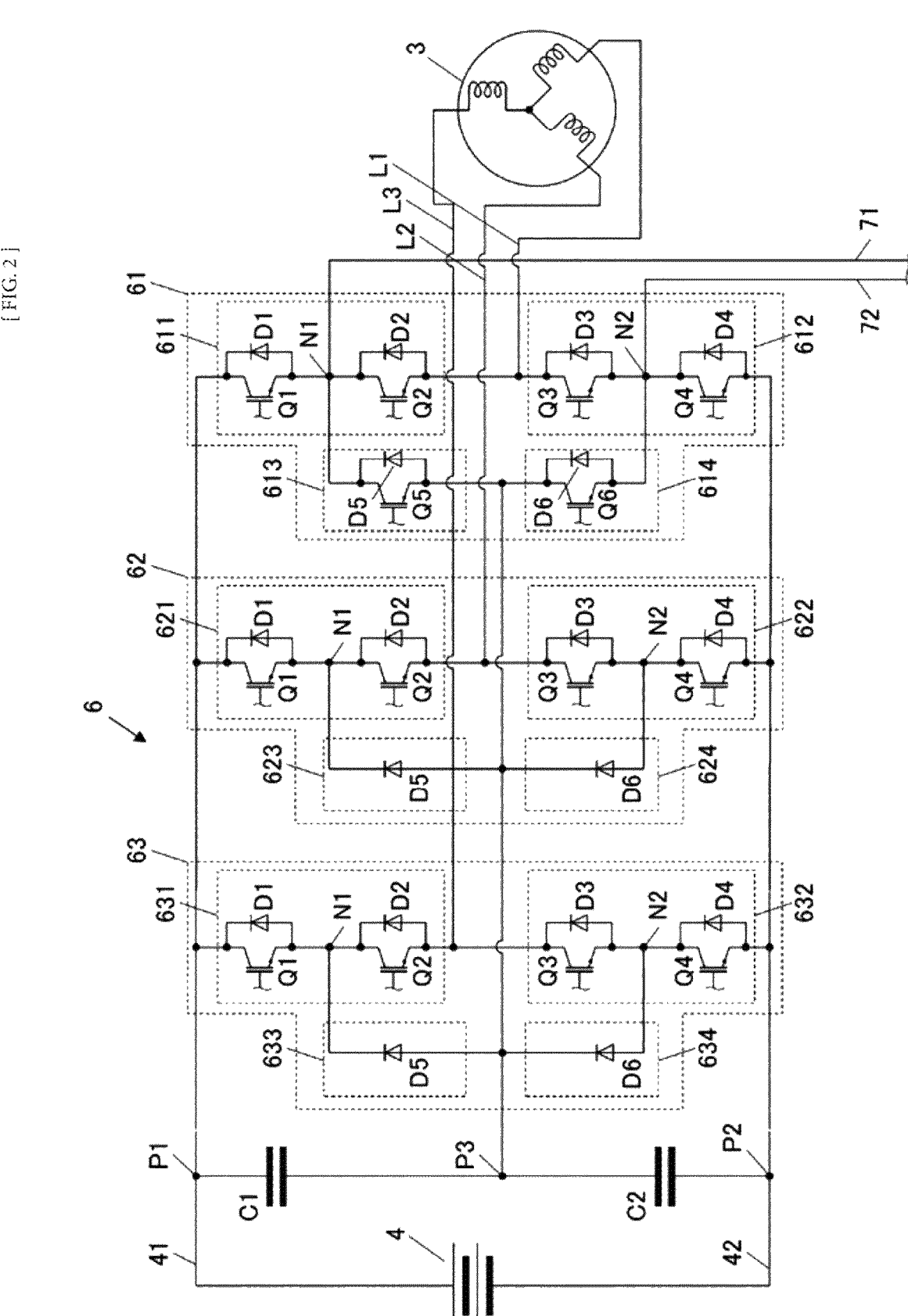

[ FIG. 3 ]
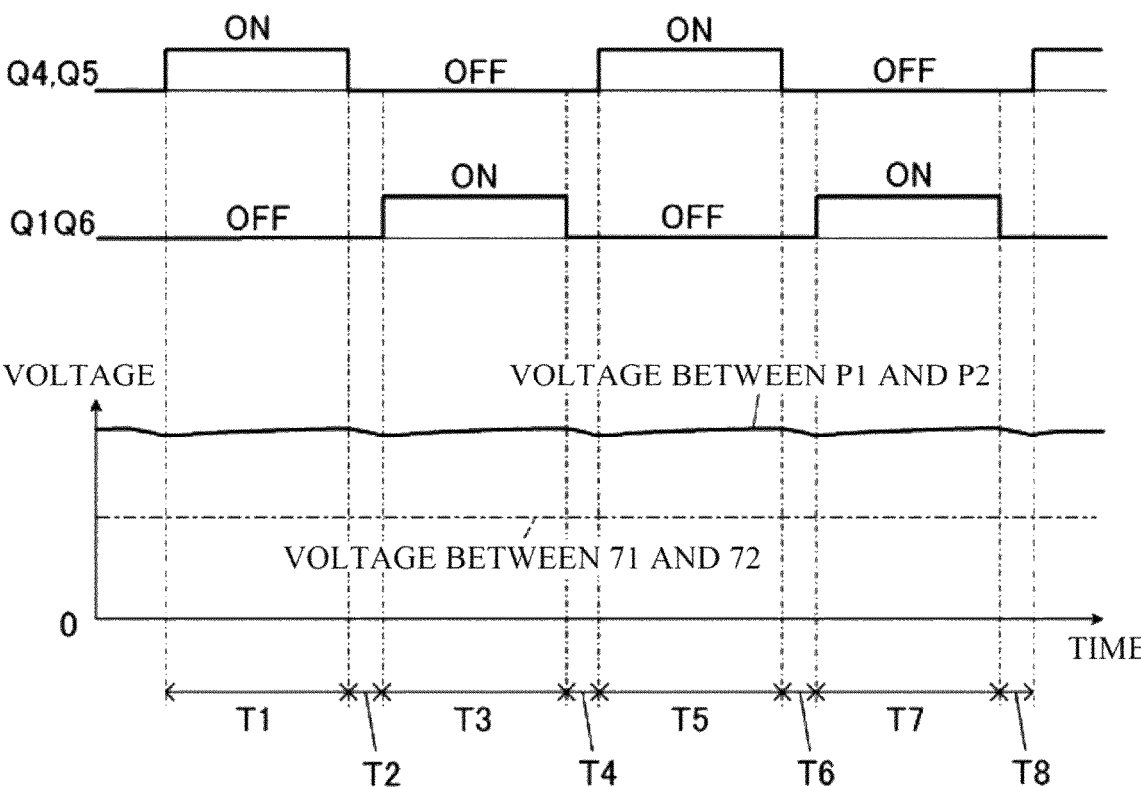

[ FIG. 4 ]
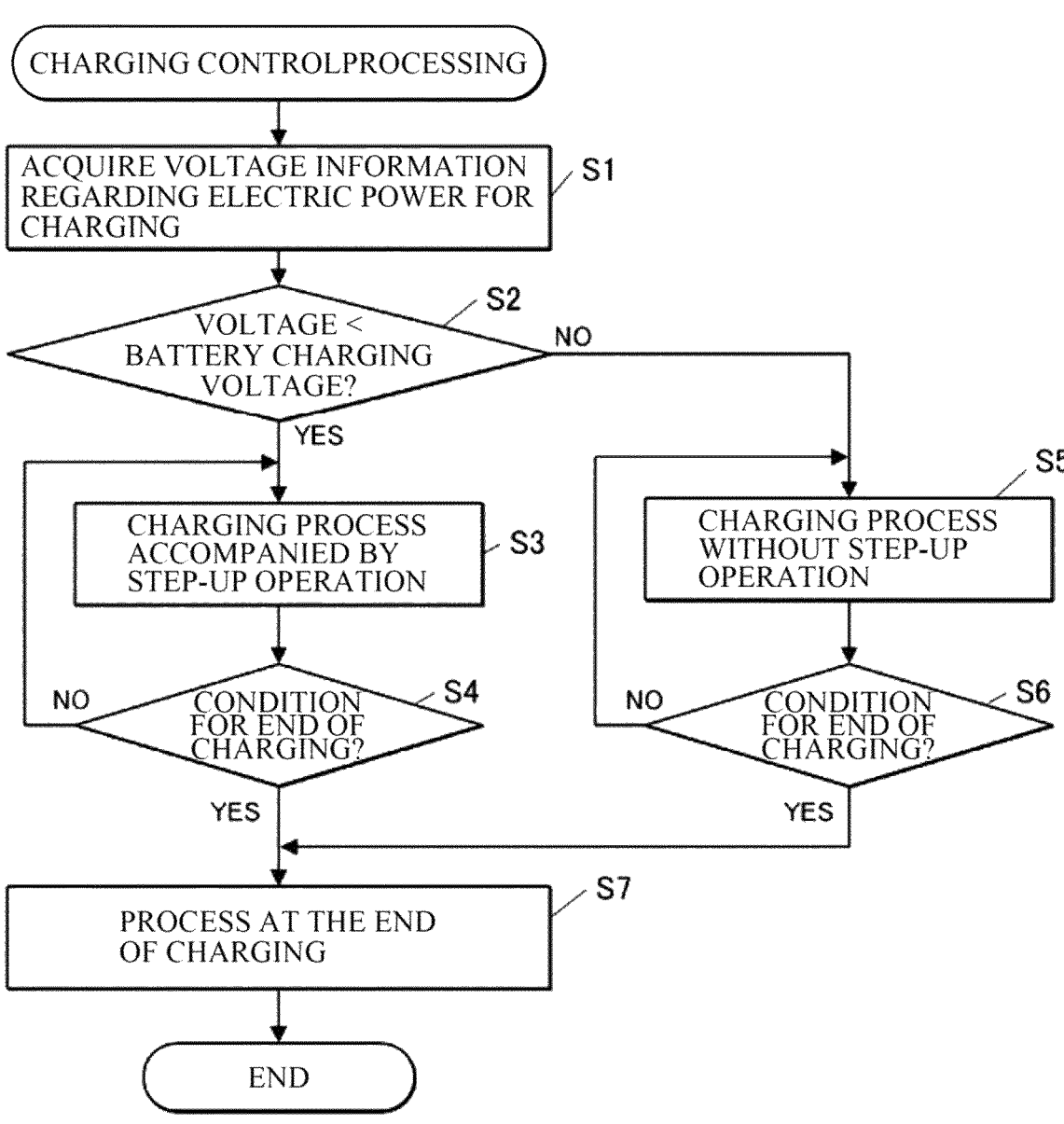

CHARGER FOR ELECTRIC VEHICLE

CROSS-REFERENCE TO RELATED APPLICATIONS

This application is the U.S. National Phase under 35 U.S.C. § 371 of International Application No. PCT/JP2023/017949, filed on May 12, 2023, the entire contents of which are hereby incorporated by reference.

TECHNICAL FIELD

The invention relates to a charger for an electric vehicle.

BACKGROUND ART

Patent Literature 1 discloses stepping up an inputted voltage, with the use of a bidirectional switching multilevel inverter circuit, by charge pump operation of the multilevel inverter circuit, to charge a battery with a higher voltage than the inputted voltage.

CITATION LIST

Patent Literature

Patent Literature 1: Japanese Unexamined Patent Application Publication No. 2022-108885

SUMMARY OF INVENTION

Problem to be Solved by the Invention

Electric vehicles including a high-voltage battery are sometimes supplied with a charging voltage lower than a voltage of the battery. In such cases, making it possible to step up the charging voltage without using a dedicated step-up circuit and supply the charging voltage to the battery would be preferable because this saves the dedicated step-up circuit.

Using the bidirectional switching multilevel inverter circuit in Patent Literature 1 makes it possible to step up the charging voltage and supply the charging voltage to the battery. However, the device is configured to be supplied with charging power through an intermediate point in a bidirectional switch. In this configuration, it is necessary to add a diode to a power line that transmits charging power to the multilevel inverter circuit. The diode suppresses current leakage from the multilevel inverter circuit to the power line. In this case, a charging current is transmitted through the additional diode, contributing to an increase in a loss.

An object of the invention is to provide a charger for an electric vehicle that makes it possible to charge a battery by step-up operation using a multilevel inverter circuit even when a low charging voltage is supplied, and attain enhancement in charging efficiency.

Means for Solving the Problem

A charger for an electric vehicle according to an aspect of the invention is a charger for an electric vehicle, the charger being configured to be mounted on the electric vehicle, the electric vehicle including a driving wheel, a travel motor configured to drive the driving wheel, and a battery configured to accumulate electric power to be supplied to the travel motor, the charger including:

a multilevel inverter circuit configured to receive electric power from the battery and output a driving current to the travel motor;

power lines in a pair through which electric power for charging is to be transmitted; and a controller configured to control the multilevel inverter circuit, wherein the multilevel inverter circuit is an NPC multilevel inverter circuit including a first potential point and a second potential point to which electric power is to be supplied from the battery, a third potential point at which a neutral point potential is to be generated, at least two capacitors configured to generate the neutral point potential, output lines configured to output the driving current, and legs respectively corresponding to the output lines, the legs each include an upper arm, a lower arm, an upper clamp configured to cut off a current from the upper arm to the third potential point, and a lower clamp configured to cut off a current from the third potential point to the lower arm, in at least one leg out of the legs, the upper clamp is an upper switching clamp configured to perform switching operation, in at least one leg out of the legs, the lower clamp is a lower switching clamp configured to perform switching operation, one of the power lines is coupled to a connection point of the upper switching clamp and the upper arm, the other one of the power lines is coupled to a connection point of the lower switching clamp and the lower arm, and the controller is configured to drive the multilevel inverter circuit to step up the electric power for charging by charge pump operation using the two capacitors.

Effects of the Invention

According to the invention, using the multilevel inverter circuit makes it possible to step up electric power for charging and send the electric power for charging to the battery. Hence, it is possible to reduce circuits or elements for stepping up. Furthermore, when stepping up the electric power for charging, it is possible to let a charging current to flow through a path with a small loss. Hence, it is possible to enhance the charging efficiency.

BRIEF DESCRIPTION OF DRAWINGS

FIG. 1 is a block diagram illustrating an electric vehicle on which a charger according to an embodiment of the invention is mounted.

FIG. 2 is a diagram illustrating a multilevel inverter circuit in FIG. 1.

FIG. 3 is a time chart illustrating step-up operation of the multilevel inverter circuit.

FIG. 4 is a flowchart illustrating charging control processing of a battery to be carried out by a controller.

MODES FOR CARRYING OUT THE INVENTION

In the following, some embodiments of the invention are described in detail with reference to the drawings. In the description, bringing a switch into a closed state is referred to as "on" and bringing a switch into an open state is referred to as "off". In the description, a connection point is assumed to include not only the relevant point but also each point of a wiring conductor continuous with the relevant point without through a circuit element.

FIG. 1 is a block diagram illustrating an electric vehicle on which a charger according to an embodiment of the invention is mounted. An electric vehicle 1 includes driving wheels 2, a travel motor 3, a battery 4, a multilevel inverter circuit 6, a controller 11, and a driving operation unit 5. The travel motor 3 drives the driving wheels 2. The battery 4 accumulates electric power to drive the travel motor 3. The multilevel inverter circuit 6 converts electric power between the battery 4 and the travel motor 3. The controller 11 controls the multilevel inverter circuit 6. With the driving operation unit 5, a driver makes a driving operation. The driving operation unit 5 includes a steering operation unit (for example, a steering wheel) 5a with which the driver makes a steering operation, an acceleration operation unit (for example, an accelerator pedal) 5b with which the driver makes an acceleration operation, and a deceleration operation unit (for example, a brake pedal) 5c with which the driver makes a deceleration operation. The multilevel inverter circuit 6 receives electric power from the battery 4 during powering operation of the travel motor 3 and outputs a driving current to the travel motor 3.

Furthermore, the electric vehicle 1 includes a power acquirer 7, a pair of power lines 71 and 72, a communicator 8, and a voltage sensor 9. The power acquirer 7 takes in electric power from outside. The pair of power lines 71 and 72 transmit electric power for charging taken in from the power acquirer 7. The communicator 8 communicates with external equipment 80 for charging. The voltage sensor 9 detects a voltage between the power lines 71 and 72.

The charger 20 of this embodiment includes the multilevel inverter circuit 6, the power acquirer 7, the power lines 71 and 72, the communicator 8, the voltage sensor 9, and the controller 11.

The controller 11 is a microcomputer including a storage 11a. The controller 11 operates in accordance with control programs held in the storage 11a. When the electric vehicle 1 is traveling, the controller 11 receives a signal of an amount of operation from the driving operation unit 5 and makes, based on the signal, a control to allow the travel motor 3 to perform the powering operation or regenerative operation. The powering operation or the line operation is realized by driving the multilevel inverter circuit 6. By the operation of the travel motor 3, the electric vehicle 1 travels.

In addition, when electric power is taken in from the power acquirer 7, the controller 11 charges the battery 4 by driving the multilevel inverter circuit 6 for charging. It is to be noted that the controller 11 may include multiple microcomputers that communicate with one another and cooperate with one another. In this case, a microcomputer that makes a travel control and a microcomputer that makes a charging control may have different configurations.

The communicator 8 receives information regarding electric power to be supplied from the external equipment 80, and sends the information to the controller 11. Information regarding charging power includes information indicating a voltage of electric power to be supplied.

The battery 4 is a lithium-ion secondary battery but is not limited to this kind. Any kind may be adopted. A voltage of the battery 4 is a first voltage system (for example, an 800 V system).

The power acquirer 7 is a connector to which a power cable 81 of the external equipment 80 is connectable, and acquires electric power for charging by wire. The external equipment 80 includes a first-class external equipment and a second-class external equipment. The first-class external equipment is configured to supply DC charging power at a voltage of the first voltage system (for example, the 800 V system). The second-class external equipment is configured to supply DC charging power at a voltage of a second voltage system lower than the first voltage system (for example, a 400 V system). It is to be noted that the power acquirer 7 may be configured to acquire charging power from external equipment in a non-contact manner by electromagnetic action, and supply DC electric power through a rectifier circuit or the like.

The power lines 71 and 72 are coupled to the multilevel inverter circuit 6. The charging power taken in from the power acquirer 7 is sent to the battery 4 through some elements of the multilevel inverter circuit 6 and the power lines. Relays may be provided halfway the power lines 71 and 72. The relays are configured to disconnect the power lines 71 and 72.

<Multilevel Inverter Circuit>

FIG. 2 is a diagram illustrating the multilevel inverter circuit in FIG. 1. The multilevel inverter circuit 6 is a substantially diode-clamped NPC (Neutral Point Clamped) multilevel inverter circuit. The multilevel inverter circuit 6 includes a first potential point P1 and a second potential point P2, at least two capacitors C1 and C2 coupled in series, a third potential point P3, output lines L1 to L3, and legs 61 to 63. To the first potential point P1 and the second potential point P2, electric power is supplied from the battery 4. At the third potential point P3, a neutral point potential is generated by the capacitors C1 and C2. The output lines L1 to L3 output the driving current to the travel motor 3. The legs 61 to 63 correspond respectively to the output lines L1 to L3. In the following, description is given of a configuration including the three output lines L1 to L3 corresponding to the three-phase travel motor 3, and the three legs 61 to 63.

To the first potential point P1 and the second potential point P2, power lines 41 and 42 are respectively coupled. The power lines 41 and 42 are coupled to the battery 4. Although not illustrated, on the power lines 41 and 42, relays may be provided. The relays are configured to disconnect the power lines 41 and 42.

The capacitors C1 and C2 are coupled in series between the first potential point P1 and the second potential point P2. The capacitors C1 and C2 generate the neutral point potential, with their connection point assumed as the third potential point P3. The neutral point potential is a potential intermediate between a potential of the first potential point P1 and a potential of the second potential point P2. The neutral point potential is lower than the potential of the first potential point P1, and is higher than the potential of the second potential point P2.

A first leg 61 is a circuit configured to switch between coupling of the corresponding output line L1 and the first potential point P1, coupling of the corresponding output line L1 and the second potential point P2, and coupling of the corresponding output line L1 and the third potential point P3. A second leg 62 is a circuit configured to switch between coupling of the corresponding output line L2 and the first potential point P1, coupling of the corresponding output line L2 and the second potential point P2, and coupling of the corresponding output line L2 and the third potential point P3. A third leg 63 is a circuit configured to switch between coupling of the corresponding output line L3 and the first potential point P1, coupling of the corresponding output line L3 and the second potential point P2, and coupling of the corresponding output line L3 and the third potential point P3.

The first to third legs 61 to 63 respectively include upper arms 611, 621, and 631, lower arms 612, 622, and 632, upper clamps 613, 623, and 633, and lower clamps 614, 624, and 634. The upper arms 611, 621, and 631 are circuit portions that let currents flow from the first potential point P1 respectively to the output lines L1 to L3 during the powering operation of the travel motor 3. The lower arms 612, 622, and 632 are circuit portions that let currents flow respectively from the output lines L1 to L3 to the second potential point P2 during the powering operation of the travel motor 3. The upper clamps 613, 623, and 633 are circuit portions that let currents flow from the third potential point P3 respectively to the upper arms 611, 621, and 631, and cut off currents respectively from the upper arms 611, 621, and 631 to the third potential point P3, during the powering operation of the travel motor 3. The lower clamps 614, 624, and 634 are circuit portions that let currents flow respectively from the lower arms 612, 622, and 632 to the third potential point P3, and cut off currents from the third potential point P3 respectively to the lower arms 612, 622, and 632, during the powering operation of the travel motor 3.

<First Leg 61>

The upper arm 611 includes a first switch Q1 and a second switch Q2 coupled in series between the first potential point P1 and the output line L1.

The lower arm 612 includes a third switch Q3 and a fourth switch Q4 coupled in series between the second potential point P2 and the output line L1.

The first switch Q1 to the fourth switch Q4 are power-semiconductor switching elements configured to be driven to be opened and closed. To the first switch Q1 to the fourth switch Q4, IGBT (Insulated Gate Bipolar Transistor) or FET ((Field Effect Transistor), etc. may be applicable. To the first switch Q1 to the fourth switch Q4, freewheeling diodes D1 to D4 may be respectively coupled in parallel. To the freewheeling diodes D1 to D4, power-semiconductor diodes may be applicable, or alternatively, parasitic diodes of the first switch Q1 to the fourth switch Q4 may be applicable.

The upper clamp 613 is coupled to between a connection point N1 of the first switch Q1 and the second switch Q2, and the third potential point P3. The upper clamp 613 is configured to perform switching operation. In the following, the upper clamp 613 is also referred to as an "upper switching clamp 613". The upper switching clamp 613 includes a fifth switch Q5 and a diode D5 coupled in parallel to each other. When the fifth switch Q5 is off, the upper switching clamp 613 is configured to let a current flow from the third potential point P3 to the connection point N1 while cutting off a current in an opposite direction. When the fifth switch Q5 is on, the upper switching clamp 613 is configured to let a current flow from the connection point N1 to the third potential point P3.

The lower clamp 614 is coupled to between a connection point N2 of the third switch Q3 and the fourth switch Q4, and the third potential point P3. The lower clamp 614 is configured to perform switching operation. In the following, the lower clamp 614 is also referred to as a "lower switching clamp 614". The lower switching clamp 614 includes a sixth switch Q6 and a diode D6 coupled in parallel to each other. When the sixth switch Q6 is off, the lower switching clamp 614 is configured to let a current flow from the connection point N2 to the third potential point P3 while cutting off a current in an opposite direction. When the sixth switch Q6 is on, the lower switching clamp 614 is configured to let a current flow from the third potential point P3 to the connection point N2.

To the fifth switch Q5 and the sixth switch Q6, power semiconductors such as IGBT or FET, etc. may be applicable. To the diodes D5 and D6, power-semiconductor diodes may be applicable, or alternatively, parasitic diodes of the fifth switch Q5 and the sixth switch Q6 may be applicable.

<Second Leg 62 and Third Leg 63>

The upper arms 621 and 631 are similar to the upper arm 611 of the first leg 61. The lower arms 622 and 632 are similar to the lower arm 612 of the first leg 61. The upper clamps 623 and 633 include the diode D5 for clamping, as with the first leg 61. Meanwhile, unlike the first leg 61, the upper clamps 623 and 633 are devoid of the fifth switch Q5. The lower clamps 624 and 634 include the diode D6 for clamping, as with the first leg 61. Meanwhile, unlike the first leg 61, the lower clamps 624 and 634 are devoid of the sixth switch Q6.

<Operation of Multilevel Inverter Circuit 6>

According to the multilevel inverter circuit 6 configured as described above, the first leg 61 acts as follows. That is, when the first and second switches Q1 and Q2 are turned on, and the third and fourth switches Q3 and Q4 are turned off, the first potential point P1 and the output line L1 are coupled to allow a current to be outputted from the first potential point P1 to the output line L1. When the second switch Q2 is turned on, and the first, third, and fourth switches Q1, Q3, and Q4 are turned off, the third potential point P3 and the output line L1 are coupled to allow a current to be outputted from the third potential point P3 to the output line L1. When the third switch Q3 is turned on, and the first, second, and fourth switches Q1, Q2, and Q4 are turned off, the third potential point P3 and the output line L1 are coupled to allow a current to return from the output line L1 to the third potential point P3. When the first and second switches Q1 and Q2 are turned off, and the third and fourth switches Q3 and Q4 are turned on, the second potential point P2 and the output line L1 are coupled to allow a current to return from the output line L1 to the second potential point P2. When the first to fourth switches Q1 to Q4 are turned off, the first potential point P1 to the third potential point P3 and the output line L1 are disconnected. The same applies to the legs 62 and 63.

Thus, the controller 11 switches states of the legs 61 to 63 to any one of the five states described above with different phases, to output, to the output lines L1 to L3, multiple levels of voltages between the pairs of potential points out of the first potential point P1, the second potential point P2, and the third potential point P3. By the output, it is possible to drive the travel motor 3. When allowing the travel motor 3 to perform the powering operation, the controller 11 maintains the fifth switch Q5 and the sixth switch Q6 in the open state.

It is to be noted that in a period when a current is allowed to flow to the diode D5 of the first leg 61, the controller 11 may make a control to turn on the fifth switch Q5 and let a current flow to the fifth switch Q5. Furthermore, when such a control is made, the diode D5 of the first leg 61 may be omitted. Similarly, in a period when a current is allowed to flow to the diode D6 of the first leg 61, the controller 11 may make a control to turn on the sixth switch Q6 and let a current flow to the sixth switch Q6. Furthermore, when such a control is made, the diode D6 may be omitted.

<Coupling of Power Line for Charging and Multilevel Inverter Circuit>

One of the power lines 71 and 72 that transmit electric power for charging from the power acquirer 7 is coupled to the connection point N1 of the upper arm 611 of the first leg

61 and the upper switching clamp 613. The other is coupled to the connection point N2 of the lower arm 612 of the first leg 61 and the lower switching clamp 614.

<Step-Up Operation of Multilevel Inverter Circuit>

The charger 20 of the embodiment has a function of stepping up, by charge pump operation, electric power for charging taken in from the power acquirer 7, and sending the electric power to the battery 4.

FIG. 3 is a time chart illustrating step-up operation of the multilevel inverter circuit. When causing the step-up operation, the controller 11 alternately switches between a control to turn on the fourth switch Q4 and the fifth switch Q5 (terms T1 and T5) and a control to turn on the first switch Q1 and the sixth switch Q6 (terms T3 and T7). Between the switching, pause periods (terms T2, T4, T6, and T8) may be inserted in which the first switch Q1 to the sixth switch Q6 are turned off.

Turning on the fourth switch Q4 and the fifth switch Q5 causes a voltage between the power lines 71 and 72 to be applied to the lower-order capacitor C2, causing the capacitor C2 to be charged. Turning on the first switch Q1 and the sixth switch Q6 causes the voltage between the power lines 71 and 72 to be applied to the upper-order capacitor C1, causing the capacitor C1 to be charged. It is to be noted that when the first switch Q1 and the fourth switch Q4 are IGBTs that cannot let a reverse current flow, currents flow through the freewheeling diodes D1 and D4 to realize charging of the capacitors C1 and C2 mentioned above.

As a consequence of the charging of the capacitors C1 and C2, by the charge pump operation, a charging voltage is generated between the first potential point P1 and the second potential point P2. The charging voltage is an addition of the voltages of the two capacitors C1 and C2. It is possible to step up the charging voltage to approximately twice the voltage between the power lines 71 and 72.

<Charging Control Processing>

Description is given next of charging control processing of the battery 4 to be carried out by the controller 11. FIG. 4 is a flowchart illustrating the charging control processing.

The controller 11 starts the charging control processing based on any charging request. At the start of the charging control processing, the controller 11 acquires the information regarding the voltage of electric power for charging to be inputted through the power lines 71 and 72, that is, the voltage of the external equipment 80 (step S1). The information regarding the voltage may be sent from the external equipment 80 that supplies the charging power, to the controller 11 through the communicator 8, or alternatively, the information regarding the voltage may be information detected by the voltage sensor 9.

Next, the controller 11 determines whether or not the voltage described above is lower than a charging voltage of the battery 4 (step S2). As a result, when the voltage is lower than the charging voltage of the battery 4 in which, for example, the charging voltage of the battery 4 is a 800 V system, and the voltage of the electric power for charging is a 400 V system, the controller 11 carries out a charging process accompanied by the step-up operation (step S3).

In step S3, the controller 11 starts acquisition of electric power from the power acquirer 7, and further makes a driving control of the multilevel inverter circuit 6 illustrated in FIG. 3. In detail, the controller 11 makes the driving control in FIG. 3 while adjusting lengths of the pause periods T2, T4, T6, and T8, to allow the charging current or the charging voltage to be outputted to the battery 4 to take a planned current value or a planned voltage value. Here, in addition to the adjustment of the pause periods T2, T4, T6, and T8, the controller 11 may adjust the current or the voltage to be outputted to the battery 4 by adjusting lengths of charging periods T1, T3, T5, and T7 of the capacitors C1 and C2. By the process in step S3, it is possible to step up the low voltage of the electric power supplied from the external equipment 80, to the charging voltage of the battery 4 or higher, and charge the battery 4 with the voltage stepped up.

In parallel with the charging process in step S3, the controller 11 determines whether a condition for an end of the charging of the battery 4 has been reached (step S4). To the condition for the end of the charging, various conditions may be applicable, e.g., that the charging has reached a specified amount of electric power, that the charging has reached specified charging time, and that the charging has reached a specified charging rate of the battery 4. Thus, when a determination result in step S4 is YES, the controller 11 performs a process at the end of charging (step S7), and ends the charging control processing. The process at the end of charging includes, for example, a communication process to notify the external equipment 80 of the end of charging, a process to turn off the relays on the power lines 71 and 72, and the like.

Meanwhile, when the determination result in step S2 is a determination that the voltage is equal to or higher than the charging voltage, the controller 11 carries out a charging process without the step-up operation (step S5).

In step S5, the controller 11 sends the electric power supplied from the power acquirer 7 to the battery 4 through the first switch Q1 or the freewheeling diode D1 of the first leg 61, and through the fourth switch Q4 or the freewheeling diode D4 of the first leg 61. Thus, the battery 4 is charged with the electric power.

In parallel with the charging process in step S5, the controller 11 determines whether the condition for the end of the charging of the battery 4 has been reached (step S6). When YES, the controller 11 performs the process at the end of charging in step S7, and ends the charging control processing.

According to the charging control processing as described above, it is possible to charge the battery 4 both in the case where the electric power for charging is received from the external equipment 80 adapted to the voltage system of the battery 4 and in the case where the electric power for charging is received from the external equipment 80 of the voltage system lower than the voltage system of the battery 4.

A program of the charging control processing described above is held in a non-transitory storage medium (non transitory computer readable medium) such as the storage 11a of the controller 11. The controller 11 may be configured to read a program held in a portable non-transitory recording medium and execute the program. The portable non-transitory storage medium mentioned above may hold the program of the charging control processing described above.

As described, according to the charger 20 for the electric vehicle 1 of the embodiment, by the charge pump operation using the capacitors C1 and C2 of the multilevel inverter circuit 6, it is possible to step up the electric power for charging taken in from the power acquirer 7 and send the electric power to the battery 4. Accordingly, even when the voltage of the electric power for charging is lower than the voltage of the battery 4, it is possible to step up the voltage and charge the battery 4. Furthermore, it is possible to save a dedicated step-up circuit, leading to reduction in manufacturing costs of the charger 20 and reduction in volume of the device.

Furthermore, according to the charger 20 for the electric vehicle 1 of the embodiment, the upper clamp 613 of the one leg 61 is the upper switching clamp 613 configured to perform the switching operation, and the lower clamp 614 of the one leg 61 is the lower switching clamp 614 configured to perform the switching operation. Moreover, the one power line 71 of the power acquirer 7 is coupled to the connection point of the upper switching clamp 613 and the upper arm 611 of the multilevel inverter circuit 6. Furthermore, the other power line 72 is coupled to the connection point of the lower switching clamp 614 and the lower arm 612 of the multilevel inverter circuit 6. This inhibits occurrence of current leakage from the multilevel inverter circuit 6 through the power lines 71 and 72, making it possible to realize a simple coupling configuration of the power lines 71 and 72, and the multilevel inverter circuit 6. Accordingly, it is possible to save provision of elements that generate a loss, e.g., diodes, on a path through which the charging current flows. This makes it possible to supply the charging current to the battery 4 with a small loss. Hence, it is possible to attain enhancement in the charging efficiency.

Furthermore, according to the charger 20 for the electric vehicle 1 of the embodiment, in the charging control processing, the controller 11 acquires the information regarding the voltage to be inputted to the power lines 71 and 72. Moreover, the controller 11 switches between the charging process including performing the charge pump operation and the charging process without the charge pump operation, based on the acquired information regarding the voltage (see steps S1 to S6 in FIG. 4). Hence, it is possible to take in electric power through the same power lines 71 and 72 in the case of charging the battery 4 by taking in electric power of a low voltage from the external equipment 80 and in the case of charging the battery 4 by taking in electric power of a high voltage.

Furthermore, according to the charger 20 for the electric vehicle 1 of the embodiment, each of the upper arms 611, 621, and 631 has the configuration including the first switch Q1 and the second switch Q2 coupled in series. Furthermore, each of the lower arms 612, 622, and 632 has the configuration including the third switch Q3 and the fourth switch Q4 coupled in series. Each of the upper clamps 613, 623, and 633 is coupled to between the connection point N1 of the first switch Q1 and the second switch Q2 in the same leg, and the third potential point P3. Moreover, each of the lower clamps 614, 624, and 634 is coupled to between the connection point N2 of the third switch Q3 and the fourth switch Q4 in the same leg, and the third potential point P3. With such a configuration, it is possible to further inhibit the current leakage from the multilevel inverter circuit 6 through the power lines 71 and 72, and further simplify the coupling configuration of the power lines 71 and 72, and the multilevel inverter circuit 6. Furthermore, it is possible to realize the charge pump operation by a switching control with a small number of elements. Hence, it is possible to enhance reliability of the charger 20.

Furthermore, according to the charger 20 for the electric vehicle 1 of the embodiment, the configuration is adopted in which, out of the legs 61 to 63, the upper clamp 613 of the one leg 61 is configured to perform the switching operation, and the upper clamps 623 and 633 of the other legs 62 and 63 are the diodes D5. Similarly, the configuration is adopted in which, out of the legs 61 to 63, the lower clamp 614 of the one leg 61 is configured to perform the switching operation, and the lower clamps 624 and 634 of the other legs 62 and 63 are the diodes D6. Hence, it is possible to apply, to the other legs 62 and 63, a similar configuration and a similar control method as those of a known diode-clamped NPC multilevel inverter circuit. This leads to the reduction in the manufacturing costs and development costs of the device.

Furthermore, according to the charger 20 for the electric vehicle 1 of the embodiment, the upper clamp (upper switching clamp) 613 configured to perform the switching operation has the configuration in which the fifth switch Q5 and the diode D5 for clamping are coupled in parallel. Similarly, the lower clamp (lower switching clamp) 614 configured to perform the switching operation has the configuration in which the sixth switch Q6 and the diode D6 for clamping are coupled in parallel. Moreover, the controller 11 maintains the fifth switch Q5 and the sixth switch Q6 in the open state when allowing the travel motor 3 to perform the powering operation. Accordingly, when allowing the travel motor 3 to perform the powering operation, it is possible to apply a similar control method to that of the known diode-clamped NPC multilevel inverter circuit, to the leg 61 that lets the charging current flow. That is, it is possible to drive the legs 61 to 63 by the similar control method. In the multilevel inverter circuit 6, a ratio of a period in which the travel motor 3 is driven is significantly larger than a ratio of a charging operation period, and it is the period in which the travel motor 3 is driven that influences a degree of deterioration of the element. Hence, it is possible to suppress large variations in the degree of deterioration of the element among the legs 61 to 63.

In the forgoing, the embodiments of the invention are described. However, the invention is by no means limited to the forgoing embodiments. For example, in the forgoing embodiments, the power lines 71 and 72 that transmit electric power for charging are coupled to the one leg 61. However, one power line may be coupled to a connection point of an upper arm and an upper clamp of one leg, and the other power line may be coupled to a connection point of a lower arm and a lower clamp of a different leg. In this case, the upper clamp and the lower clamp to which the power lines are coupled may be configured to perform the switching operation. In this configuration as well, it is possible to perform the charging process accompanied by the step-up operation and the charging process without the step-up operation by the similar control.

Furthermore, in the forgoing embodiments, the configuration is described in which the one power line 71 that transmits electric power for charging is coupled to the one leg 61. However, one power line may be coupled to multiple legs or all legs. In this case, with respect to all of the legs to which the one power line is coupled, the upper clamps may be configured to perform the switching operation, and the upper clamps may be driven simultaneously during the step-up operation, or may be driven one by one in order. In this case, to prevent a short circuit between the legs to which the one power line is coupled from occurring through the power line when the travel motor 3 is driven, a switch may be provided on the power line, and the switch may be maintained in the open state. The same applies to the other power line and the lower clamps.

Furthermore, in the forgoing embodiments, the configuration is given in which the upper clamps 623 and 633 are the diodes D5. However, the upper clamps 623 and 633 may include switching elements such as FETs. Similarly, in the forgoing embodiments, the configuration is given in which the lower clamps 624 and 634 are the diodes D6. However, the lower clamps 624 and 634 may be switching elements such as FETs. In this configuration, the controller 11 may control the switching elements to be turned on in a period when currents flow through the diodes D5 and D6 when the travel motor 3 is driven. According to such a configuration, it is possible to reduce a loss when currents flow through the upper clamps 613, 623, and 633, and the lower clamps 614, 624, and 634. This leads to enhancement in efficiency of the multilevel inverter circuit 6 both when the travel motor 3 is driven and when the battery 4 is charged in accompaniment with the step-up operation.

Moreover, in the forgoing embodiments, the configuration is given in which the electric power for charging is sent from the external equipment 80. However, the electric power for charging may be electric power generated inside the electric vehicle (for example, regenerative electric power). Moreover, the electric vehicle may be an electric vehicle including an engine such as an HEV (Hybrid Electric Vehicle) or a PHEV (Plug-in Hybrid Electric Vehicle). Other details described in the embodiments may be appropriately modified without departing from the scope of the invention.

INDUSTRIAL APPLICABILITY

The invention is applicable to a charger for an electric vehicle.

DESCRIPTION OF REFERENCE NUMERALS

1 Electric Vehicle
2 Driving wheel
3 Travel motor
4 Battery
5 Driving operation unit
6 Multilevel inverter circuit
7 Power acquirer
71 and 72 Power line
8 Communicator
9 Voltage sensor
11 Controller
11a Storage
L1 to L3 Output line
61 to 63 Leg
611, 621, and 631 Upper arm
612, 622, and 632 Lower arm
613 Upper switching clamp (Upper clamp)
623 and 633 Upper clamp
614 Lower switching clamp (Lower clamp)
624 and 634 Lower clamp
80 External equipment
C1 and C2 Capacitor
P1 First potential point
P2 Second potential point
P3 Third potential point
Q1 First switch
Q2 Second switch
Q3 Third switch
Q4 Fourth switch
Q5 Fifth switch
Q6 Sixth switch
D1 to D4 Freewheeling diode
D5 and D6 Diode
N1 and N2 Connection point

The invention claimed is:

1. A charger for an electric vehicle, the charger being configured to be mounted on the electric vehicle, the electric vehicle comprising a driving wheel, a travel motor configured to drive the driving wheel, and a battery configured to accumulate electric power to be supplied to the travel motor, the charger comprising:

a multilevel inverter circuit configured to receive electric power from the battery and output a driving current to the travel motor;

power lines through which electric power for charging is to be transmitted; and a controller configured to control the multilevel inverter circuit, wherein the multilevel inverter circuit is an NPC multilevel inverter circuit comprising a first potential point and a second potential point to which electric power is to be supplied from the battery, a third potential point at which a neutral point potential is to be generated, at least two capacitors configured to generate the neutral point potential, output lines configured to output the driving current, and legs respectively corresponding to the output lines, the legs each comprise an upper arm, a lower arm, an upper clamp configured to cut off a current from the upper arm to the third potential point, and a lower clamp configured to cut off a current from the third potential point to the lower arm, in at least one leg out of the legs, the upper clamp is an upper switching clamp configured to perform switching operation, in at least one leg out of the legs, the lower clamp is a lower switching clamp configured to perform switching operation, one of the power lines is coupled to a connection point of the upper switching clamp and the upper arm, another one of the power lines is coupled to a connection point of the lower switching clamp and the lower arm, and the controller is configured to drive the multilevel inverter circuit to step up the electric power for charging by charge pump operation using the two capacitors.

2. The charger for the electric vehicle according to claim 1, wherein the controller is configured to acquire information regarding a voltage of the electric power for charging and switch between a charging process including performing the charge pump operation and a charging process without the charging pump operation, based on the information regarding the voltage.

3. The charger for the electric vehicle according to claim 1, wherein the upper arm comprises a first switch and a second switch coupled in series, the lower arm comprises a third switch and a fourth switch coupled in series, the upper clamp is coupled to between a connection point of the first switch and the second switch, and the third potential point, and the lower clamp is coupled to between a connection point of the third switch and the fourth switch, and the third potential point.

4. The charger for the electric vehicle according to claim 3, wherein the upper clamp in one leg out of the legs is the upper switching clamp, and the upper clamps in another leg or other legs are diodes, and the lower clamp in one leg out of the legs is the lower switching clamp, and the lower clamps in another leg or other legs are diodes.

5. The charger for the electric vehicle according to claim 4, wherein the upper switching clamp comprises a fifth switch and a diode coupled in parallel,

the lower switching clamp comprises a sixth switch and a
   diode coupled in parallel, and the controller maintains both the fifth switch and the sixth
   switch in an open state during powering operation of
   the travel motor.

\* \* \* \* \*